May 24, 1938.　　　　　N. M. MARSILIUS　　　　　2,118,259
VERTICAL SPINDLE MILLING MACHINE
Filed Nov. 15, 1935　　　　6 Sheets-Sheet 2

INVENTOR
Newman M. Marsilius
BY
Christian M. Newman
ATTORNEY

May 24, 1938.　　　　N. M. MARSILIUS　　　　2,118,259
VERTICAL SPINDLE MILLING MACHINE
Filed Nov. 15, 1935　　　　6 Sheets-Sheet 3

Fig. 3

INVENTOR
Newman M. Marsilius
BY
Christian M. Newman
ATTORNEY

May 24, 1938.　　　N. M. MARSILIUS　　　2,118,259
VERTICAL SPINDLE MILLING MACHINE
Filed Nov. 15, 1935　　　6 Sheets-Sheet 4

Fig. 4

INVENTOR
Newman M. Marsilius
BY
Christian M. Newman
ATTORNEY

May 24, 1938.　　　　N. M. MARSILIUS　　　　2,118,259
VERTICAL SPINDLE MILLING MACHINE
Filed Nov. 15, 1935　　　　6 Sheets—Sheet 5

INVENTOR
Newman M. Marsilius
BY
Christian M. Newman
ATTORNEY

May 24, 1938.   N. M. MARSILIUS   2,118,259
VERTICAL SPINDLE MILLING MACHINE
Filed Nov. 15, 1935   6 Sheets-Sheet 6

INVENTOR
Newman M. Marsilius
BY
Christian M Newman
ATTORNEY

Patented May 24, 1938

2,118,259

UNITED STATES PATENT OFFICE 2,118,259

VERTICAL SPINDLE MILLING MACHINE

Newman M. Marsilius, Bridgeport, Conn., assignor, by mesne assignments, to The Bridgeport Bronze Company, Bridgeport, Conn., a corporation of Connecticut Application November 15, 1935, Serial No. 49,907

13 Claims. (Cl. 90—20)

This invention relates to multiple spindle vertical milling machines and has special reference to continuously operating machines designed for increased production of duplicate pieces of work.

The invention in its broader aspect comprises one or more units each of which includes two or more disposed cutter arbors and rotatable work carrying tables wherein the cutters are designed to operate in either direction and the table in an opposite direction with its axis both concentric and eccentric to the axis of the arbors.

A further object of the invention is to connect and operate the several units from a common drive shaft and to connect the same so that one unit can be in operation while the other is being unloaded and reloaded so that with each cycle of the machine two work pieces will be completed.

A further object of the invention is to provide a milling machine which is susceptible of suitable adjustments to accommodate and perform milling operations upon different kinds of work pieces, requiring one or more cuts, such as may be produced by a rotary cutter, in connection with a rotatable work table operating in either direction with respect to the spindle.

A further and more important object of the invention is to provide a vertical spindle milling machine that is adapted to perform undercutting, meaning thereby, a circular cut of greater diameter than that of the adjoining hole in the piece and to produce said operation as an annular cut, or an oblong cut, or a cut in one side of the cylindrical hole only, as is required in the work piece herein shown and for which the machine has been especially tooled.

The machine is further adapted to provide a series of undercuts, as it were, in the walls of a hole or in a cylindrical side wall as is the case with the machine herein illustrated.

My improved machine is designed to be operated by two or more independently mounted electric motors according to the number of units included in the machine, one motor being used to operate the several slides and work carrying tables while a second, third or fourth serves to drive the pairs of cutter arbors of the several units.

My invention further aims to provide a special form of multiple spindle milling machine which includes a compact organization of slides, rotary tables, cutter arbors and other instrumentalities, all of which are arranged to be operated in timed relation, so that during one cycle of the machine, milling operations will have been automatically performed on two duplicate pieces of work, while two additional pieces of work have been chucked on a second unit for similar operations. These various parts will be hereinafter more fully described in detail and reference will now be had to the drawings of the machine upon which similar characters of reference are used to designate like or corresponding parts through the several figures, and of which

Figure 4:
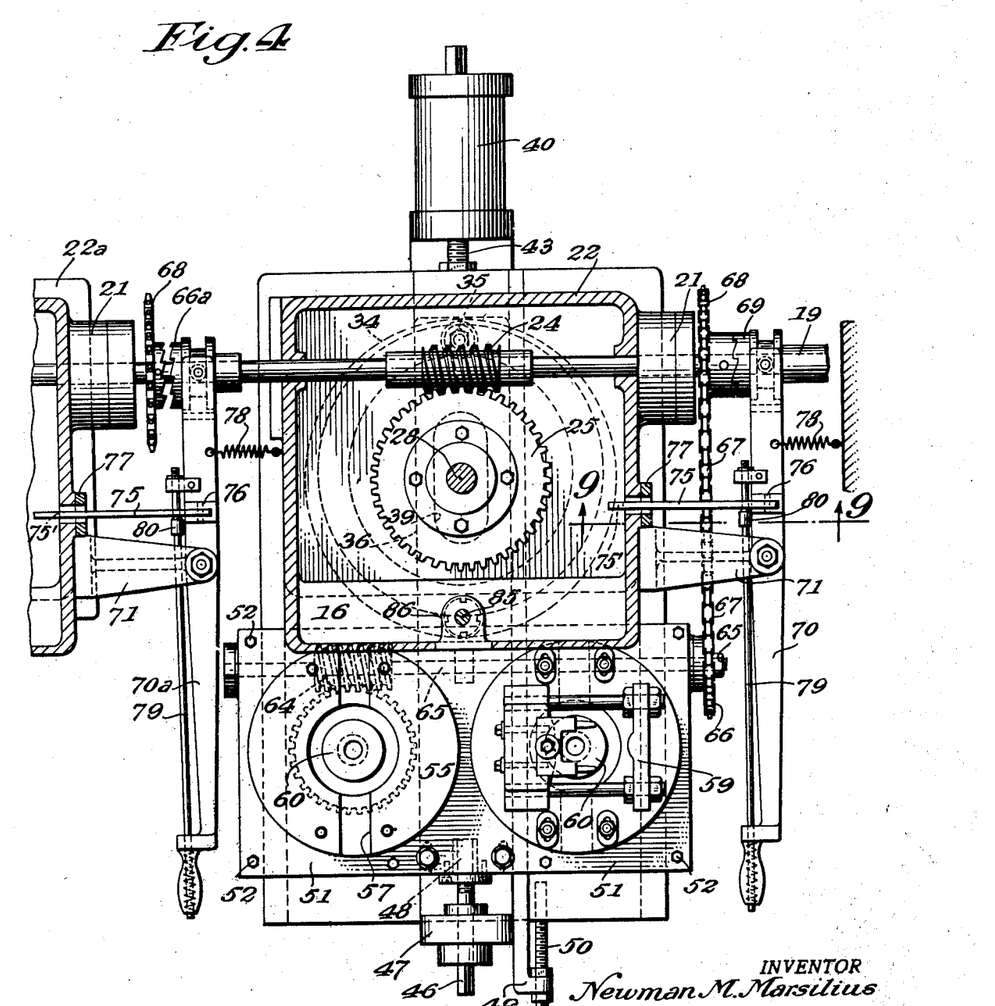
Fig. 4 shows a sectional plan view through the lower portion of the unit shown at the right in Fig. 1, and on line 4—4 of Fig. 3, but with the tool holder and upper part of the table removed at the left, better to illustrate the tables, saddle and table operating mechanism.

Referring in detail to the characters of reference marked upon the drawings, 15 indicates a base upon which the two units 16 of the milling machine are mounted, and 17 indicates a motor for operating the slides and rotary work carrying tables of the units. The drive from the motor to the machine is through a change gear mechanism 18 located in the base of the machine and connects through a chain belt, to a drive shaft 19. The outer end of this shaft is journalled in a housing bracket 20 mounted on the base 15 while the inner portion of the drive shaft, see Fig. 4 is journalled in suitable bearings 21 of the column 22. The two units 16 shown in Fig. 1, mounted upon the base, are alike in construction and consequently a detailed description of one is thought to be sufficient for a proper understanding of the second unit, or more if it is desired to increase the number.

Figures 2, 9:
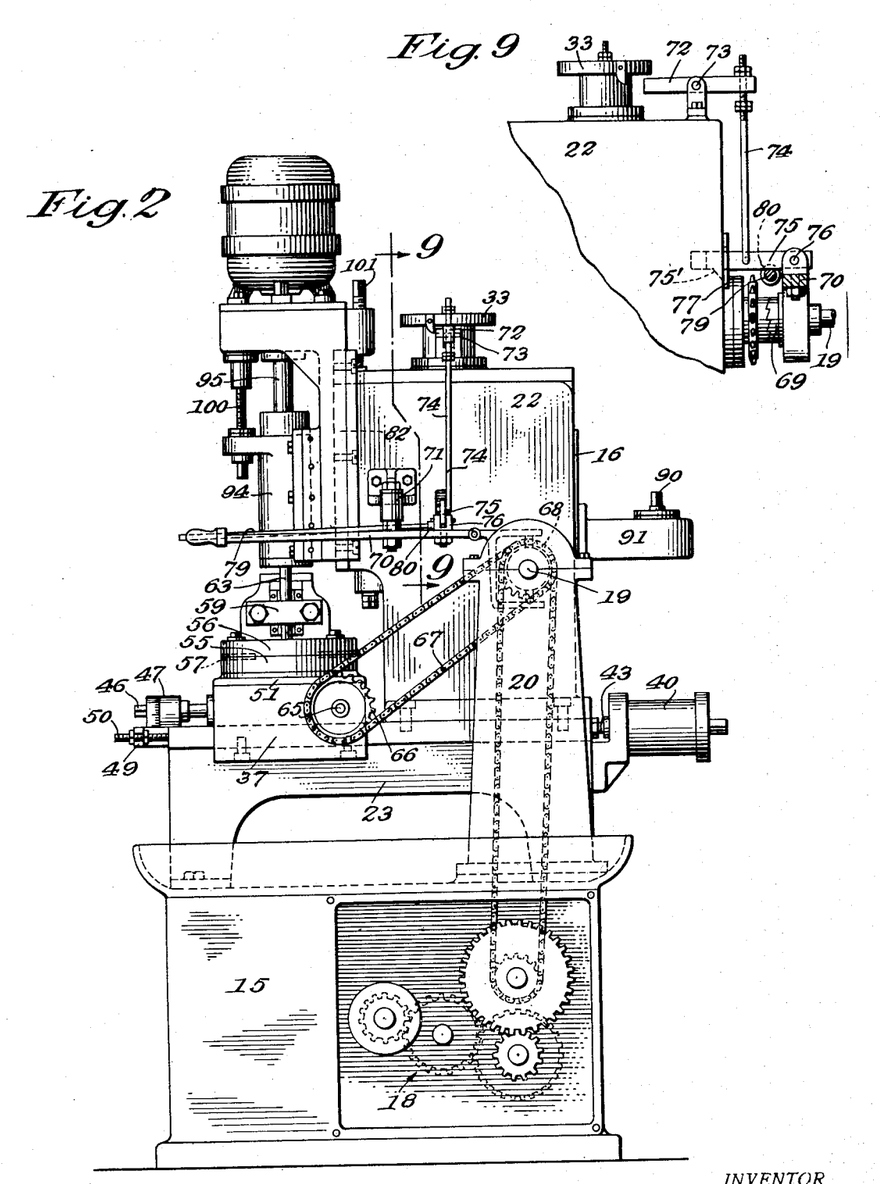
Fig. 2 is a side elevation of the same machine as seen from the right of Fig. 1.
Fig. 9 shows a detached view of the clutch tripping mechanism as seen on line 9—9 of Figs. 2 and 4.
Figure 3:
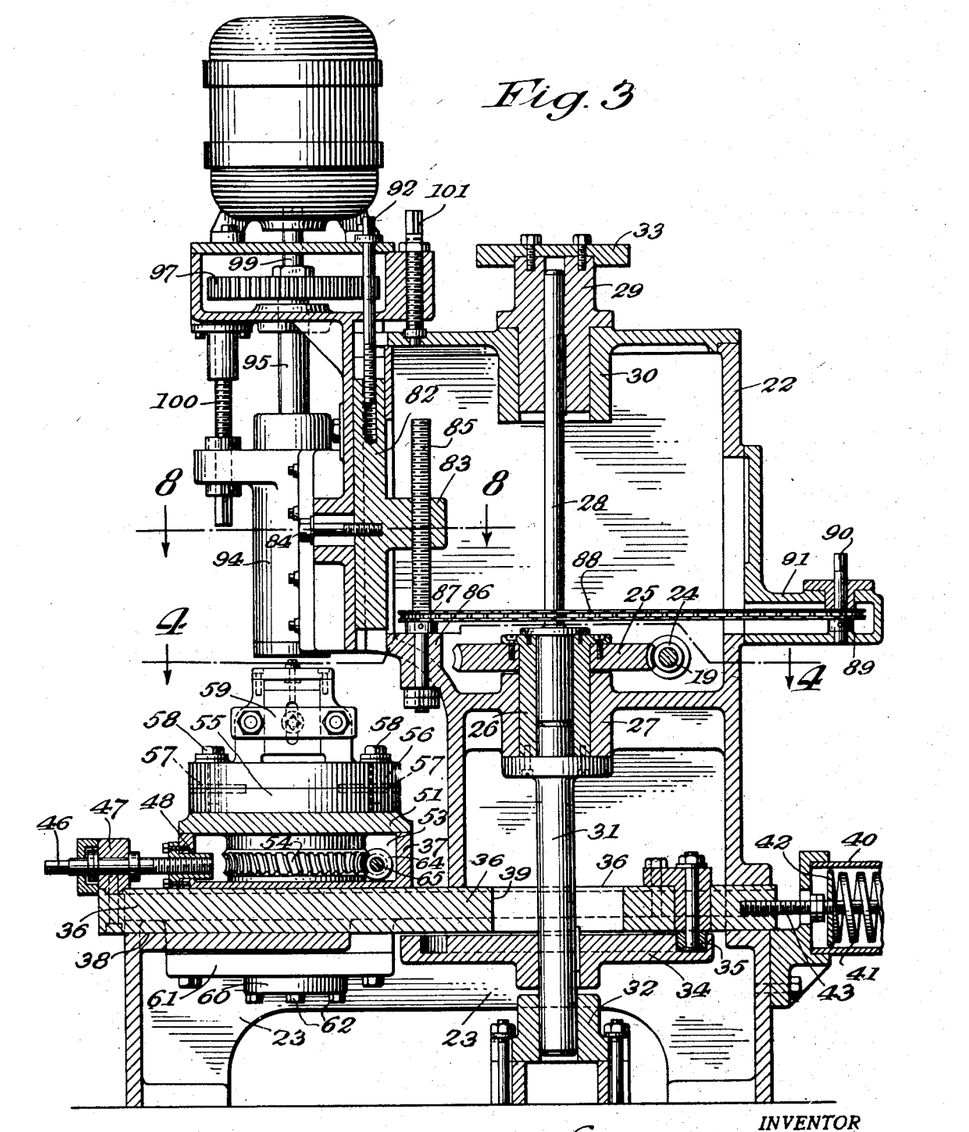
Fig. 3 shows a central vertical sectional elevation on an enlarged scale, taken on line 3—3 of Fig. 1, showing the bed, saddle and column of the machine in section and the rotary work table and spindle slide in side elevation.

Each of these units comprises a bed 23 upon which a vertical column 22 is mounted, see Figs. 2 and 3. A worm 24 is mounted upon the drive shaft 19 and meshes with a worm gear 25, secured to a sleeve 26 mounted in a bearing 27 of the column, see Figs. 3 and 4. This rotatable sleeve 26 also serves to support and rotate a vertical shaft 28 whose upper end is keyed to a sleeve 29 that is journalled in a bearing 30 of the column and carries a cam 33. One end of a lower shaft 31 is secured to the lower end of the coupling sleeve 26 and has its other end journalled in a fixed bearing 32. The two said shafts 28 and 31 are in axial alignment and obviously turn together as one, serving to rotate the cam 33 on the top end and a large grooved cam 34 on the lower end.

The cam 34 mounted on the lower section 31 of the vertical shaft is provided with an annular cam groove to receive a roller 35 carried by a horizontally reciprocable slide 36, see Figs. 3, 4, and 7, which is mounted to reciprocate in a suitable way of the bed and serves to carry a saddle 37 secured thereto as will later be explained, and mounted on ways 38 on opposite sides of the bed. This slide 36 is provided with an elongated opening 39 to accommodate the before mentioned vertical shaft 31 so as to be free to move forward and backward during the milling operation through the action of the cam 34.

In connection with this cam operated slide 36 I also desire to use spring tensioning means, see Figs. 3 and 4, to insure smooth reciprocatory movements of the slide, which comprises a spring casing 40 attached to the rear portion of the bed of the respective milling units inclosing a spring 41, one end of which abuts against the outer end of the casing, and the other end against a collar 42 within the casing and which is secured to a rod 43 threadably connected to the slide 36 and whose other end is headed to receive a wrench whereby the tension of the spring may be adjusted.

Figure 1:
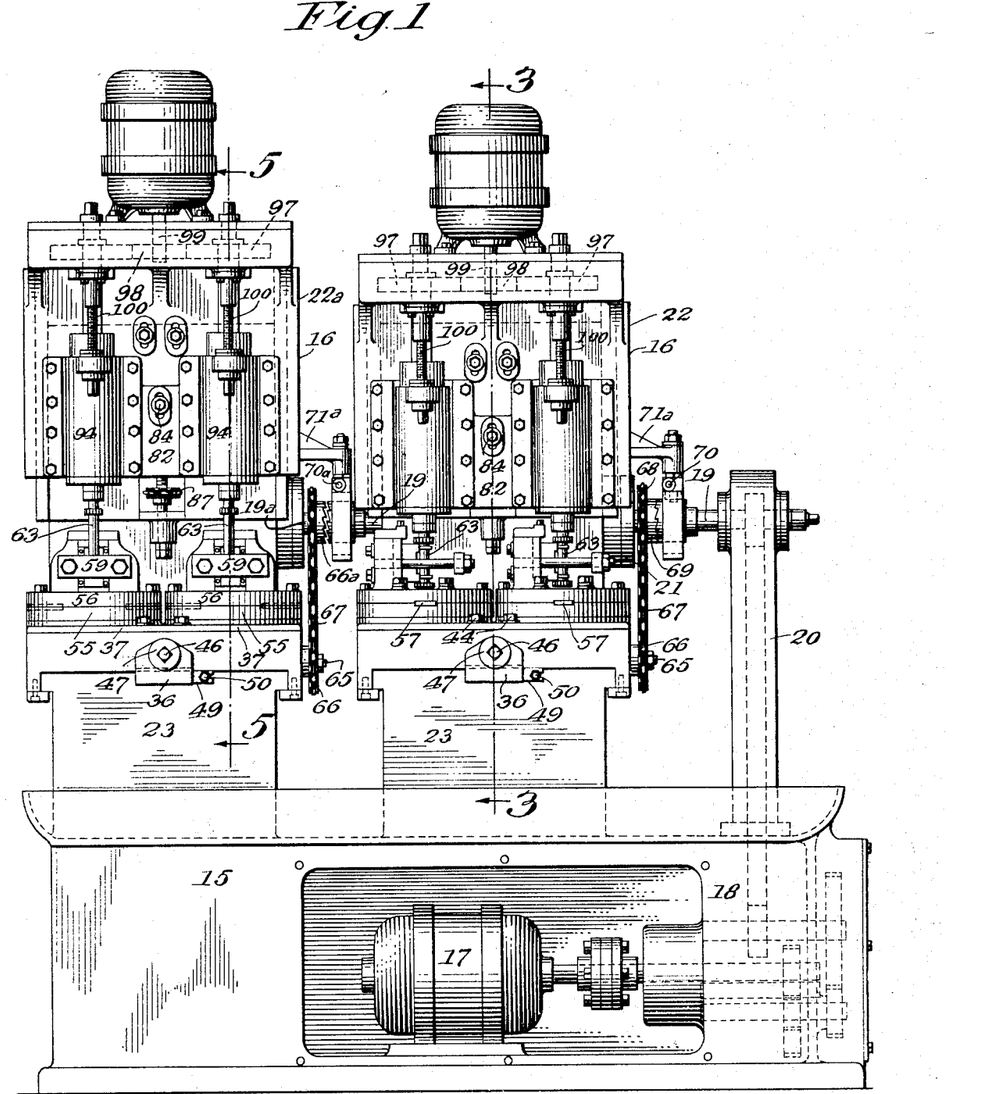
Fig. 1 shows a front elevation of my improved milling machine, including two twin spindle units so arranged with respect to each other as to permit of the alternate loading of one unit while the other is in operation.

The saddle, see Figs. 1, 2, and 3, is secured to the slide 36 by means of screw 44 of which there may be three or more, that pass through holes in the saddle and slots 45 of the slide so as to permit of slight adjustments of one with relation to the other if required. In this connection I have provided an adjusting screw 46 that is mounted in an upwardly disposed end portion 47 of the slide 36 and is threadably connected with the saddle as at 48 whereby the saddle may be adjusted forward or backward with relation to the slide, whereupon the screws 44 are again tightened to secure the parts in their adjusted position.

A gib 49, see Fig. 4, having an adjusting screw 50, is preferably employed in connection with the mounting of the slide in the bed, as is frequently the case in constructions of this sort.

Figure 5:
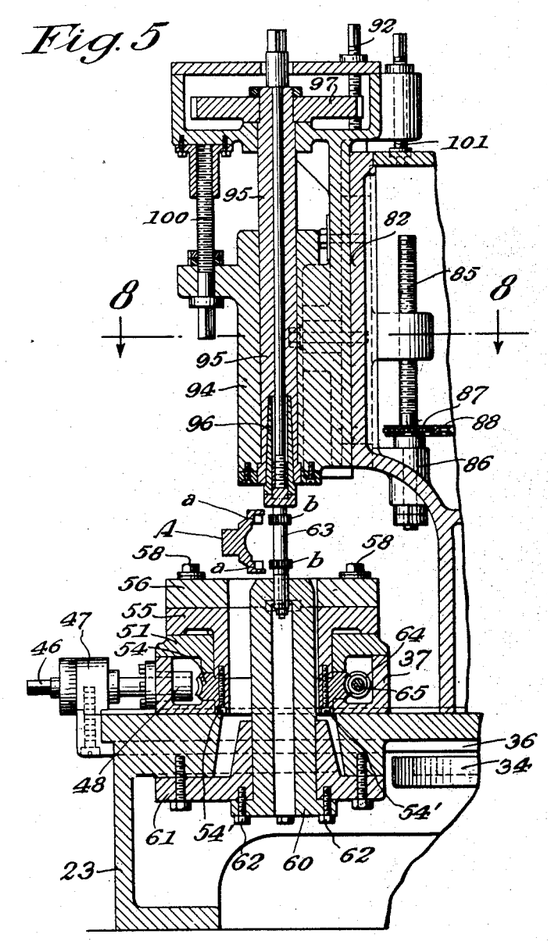
Fig. 5 shows a central vertical sectional view taken through one of the spindles and work tables as on line 5—5 of Fig. 1, the work holder being omitted, though the work table and a work piece being indicated in relation to the cutters as in the starting position, see diagrammatical view, Fig. 11.
Figures 6, 7, 8:
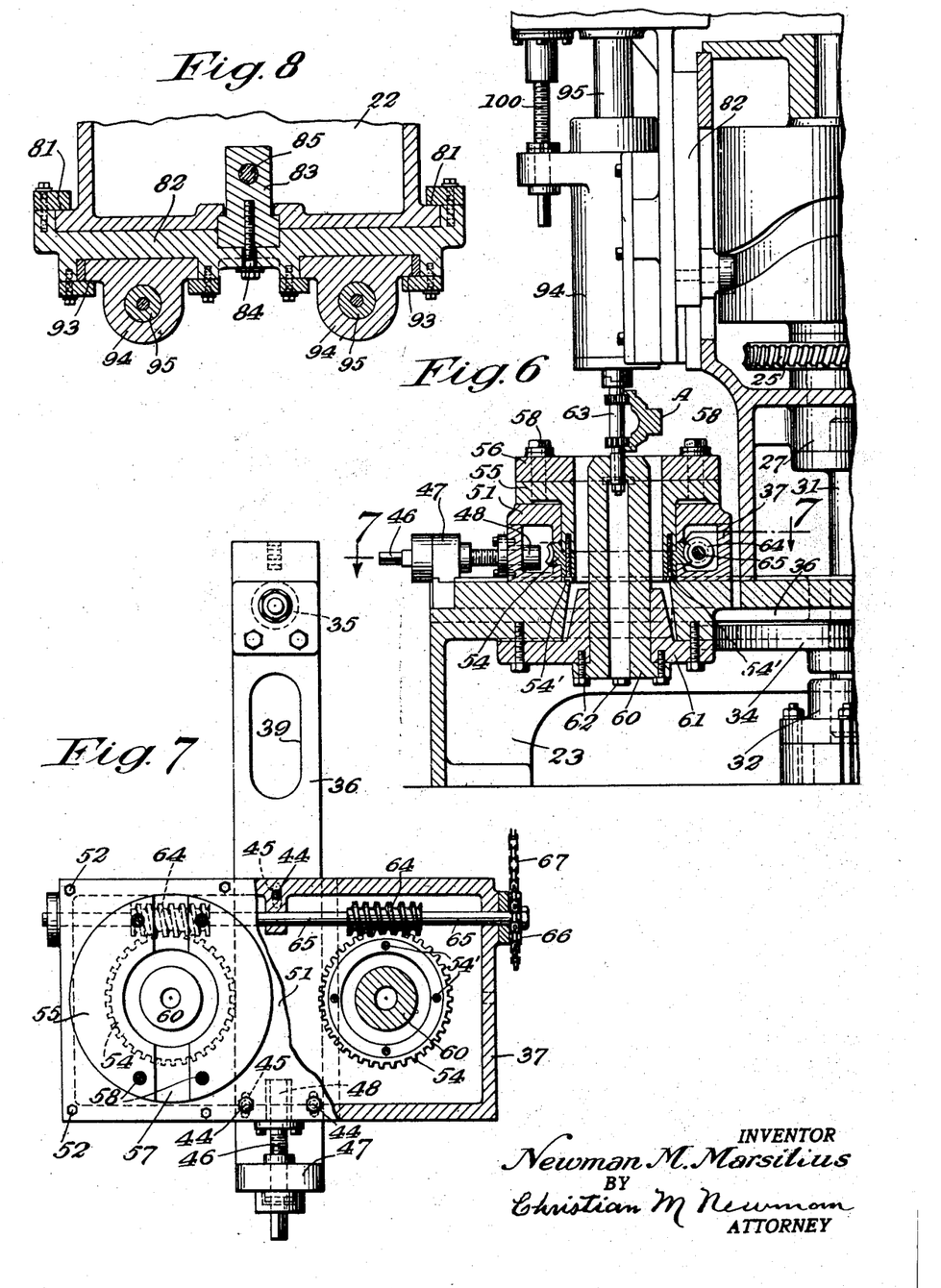
Fig. 6 shows a further central vertical sectional view in most respects similar to Fig. 5, but showing the machine in operating position, the relation of the work table and work with respect to the cutters being changed from front, see Fig. 11, to rear as indicated in Fig. 12. This view also includes a modification, including a drum cam for raising and lowering the cutter spindle slide.
Fig. 7 is a sectional plan, on an enlarged scale, of the lower slide and saddle, taken on line 7—7 of Fig. 6, showing the lower portion of one of the rotary work tables at left, and top of saddle broken away, better to illustrate the worm and gear drive for the tables.
Fig. 8 shows a horizontal cross section on a similarly enlarged scale through the column, vertical movable saddle and spindle block, taken on line 8—8, through one of the two units in Figs. 3 and 5.
Figure 10:
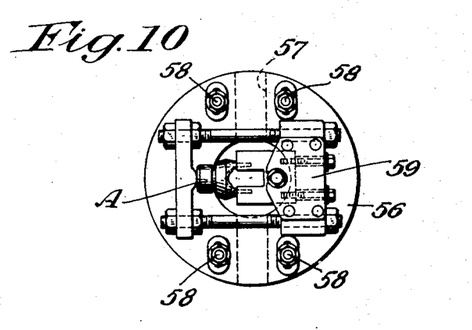
Fig. 10 is a detached plan view of one of the work tables, including its fixture for holding a work piece, not shown therein.

The saddle 37, see Figs. 3, 6, and 7, is hollow, though includes a bottom, sides and a cover 51, the latter being secured in position by means of screws 52 and when so assembled provides a space 53 in which the worm gears 54 rotate. These worm gears, as will be seen, are secured to the depending hubs of the rotary table 55 by means of screws 54', see Figs. 5 and 6, to which table the fixture plate 56 is adjustably mounted through the medium of a spline 57 and screw 58. The fixture, which I will refer to generally as 59, may obviously be of any suitable design, governed largely by the particular form of the work piece to be operated upon, and consequently need not be described in detail.

The cylindrical opening through the table 55 and the aligned opening through the gear are somewhat larger in diameter than the tubular post 60 extending up therethrough and secured, as shown in Fig. 6, to the bed through the medium of a supporting member 61 and screws 62. A vertical longitudinal hole is provided through the center of this post in axial alignment with the cutter arbor 63 later to be referred to. The upper end portion of the hole in this post serves as a bearing for the lower end of the said cutter arbor, see Figs. 5 and 6. The two rotary tables upon the saddles, together with the mechanisms just described for reciprocating the saddles and rotating the tables, comprise what might be termed a work unit, whereas the mechanism carried on the face of the column, including the electric motor positioned at the top of the spindle slide, constitutes the cutter unit. These work tables of the two units are operated from the motor 17 through its drive to the shaft 19 and through the worm gear drive and is provided with a slow rotary movement while the cam 34 and the slide 36 imparts a slight reciprocatory movement to the saddle in which the tables are mounted. The worm gear for each of the two tables mounted upon the saddle, see Fig. 7, are operated through separate worms 64 mounted upon a horizontal shaft 65 journalled in the saddle and driven through a sprocket 66 mounted on the outer end of said shaft, and which is connected by a sprocket chain 67 with a clutch faced sprocket wheel 68 loosely mounted on the before mentioned shaft 19. A companion clutch member 69 is slidably splined upon this shaft 19 in operative relation to the before mentioned clutch 68 and is designed to be engaged with said member 68 through a hand lever 70 secured to a bracket 71 made fast to the side of the column. This clutch member 69 is adapted to be released through a trip mechanism automatically operated by the cam 33 secured to the upper end of the vertical shaft 28.

This trip mechanism, see Figs. 2 and 9, comprises a lever 72 that is fulcrumed upon the column 22 as at 73 and has one end in the path of the cam 33 that operates it and the clutch 69 to automatically stop the unit of the machine at the completion of each operation. This lever 73 is connected by a link 74 with a lever 75 one end of which is hinged at 76 to the hand lever 70, and the opposite end extends into an opening of the column and has a hook 75' to engage a plate 77 secured to the side of the column. From the foregoing it will be seen that with the operation of the cam lever 72 the hook will be released in a way to allow a spring 78 to move the rear end of the hand lever outward and disengage the clutch member 69.

In addition to the foregoing automatic release of the clutch I provide hand operating means whereby the operator may disengage the clutch and stop the machine at any time during its cycle of operations. This, as will be seen, consists in providing a cam 80 on the brake rod 79 which cam is positioned, see Figs. 4 and 9, to release the hook lever by an inward movement of the rod against the action of a spring contained in the handle of the lever.

Having described the construction and method of operation of the work table units, I will proceed to describe the cutter unit, and, in this connection, attention is called to Figs. 1, 2, 5 and 8. The column 22 is provided with a vertical way 81 upon each side to accommodate a vertical slide 82 to which a rearwardly extended boss 83 is adjustably secured as by means of a screw 84. The boss is further engaged by a screw 85 that is otherwise journalled in the column as at 86 and serves for raising and lowering the before mentioned slide 82. This screw is part of a hand operatable mechanism for adjusting the slide and, as will be seen from Fig. 3, comprises a sprocket 87 mounted upon the screw 85 and connected by a sprocket chain 88 with a second sprocket 89 mounted upon a short shaft 90 journalled in a bracket 91 extended rearward from the back of the column of the machine. Shaft 90 has a headed end portion to receive a suitable hand crank for turning, to raise and lower the slide.

In addition to this raising and lowering mechanism I also provide a micrometer adjusting screw 92 mounted in the upper portion of the slide 82 and whose threaded lower end portion engages a threaded socket of the slide. The amount of adjustment of this screw is comparatively slight and is intended to take up a few thousandths only in the positioning of the slide which perhaps cannot be accurately acquired by the sprocket and chain connection.

The slide 82 is provided with two pair of ways 93, each pair serving to accommodate a spindle block 94 in which a spindle 95 is rotatably mounted. The lower end of the spindle is provided with a suitable collet 96, in which the upper end of a cutter arbor 63 is mounted. A relatively large gear 97 is mounted upon the upper end of each of these spindles and is driven, see Fig. 1, through a smaller intermediate gear 98 that is mounted upon the motor shaft 99. 100 represents an adjusting screw provided for each of the spindle blocks so as to provide a proper setting of the blocks. 101 indicates a stop screw positioned in the upper end portion of the slide 82 for engagement with the top of the column as is clearly shown in the drawings.

Having described the general construction of the machine including the one milling unit, it will be seen that the second unit 22ª shown at the left in Fig. 1, is substantially like that of the first mentioned unit above described and is preferably connected as by means of a slidable clutch member 66ª, an operating lever 70ª through which driving connections may be made to the aligned worm gear shaft 19ª mounted in the adjacent unit. The mechanism of this second unit is the same and is operated substantially like that shown in the first mentioned unit and is designed to be operated in conjunction with and in a way to duplicate the production of the first mentioned unit.

Figure 11:
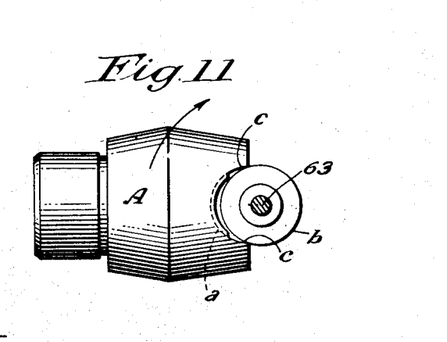
Figs. 11, 12 and 13 show diagrammatical views of a work piece in different positions with relation to a cutter arbor, as during a milling operation thereof, including its movement forward, around the cutter arbor and return to starting position.
Figure 12:
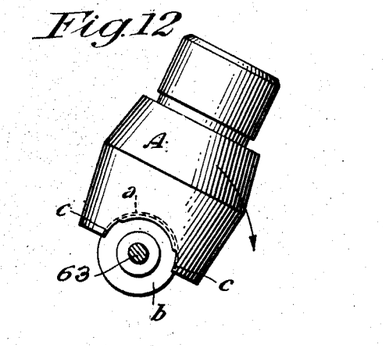
Figure 13:
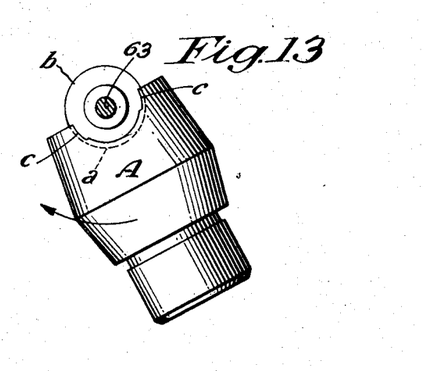

The work piece A herein shown represents a part of an automobile steering knuckle and as will be seen includes in its formation a pair of aligned cylindrically shaped undercuts a—a which require to be milled and which necessitates the use of a special chucking fixture 59 to support the piece upon the work table in proper relation to the two spaced apart cutters b—b of the cutter arbor 63. In this connection reference is made again to the reciprocatory movement of the saddle and its rotatable tables, in respect to the cutter and means for operating the same. In practice a work piece is placed in each of the fixtures, mounted upon the two tables of one unit, free of the cutters, when the tables and the saddle are in their foremost position, see Fig. 5, and prior to which the two cutter arbors are lowered into position and have their lower ends rotatably positioned in the post 60 and are being continuously rotated. An operation of the hand lever 67 starts the tables rotating in the direction of the arrow indicated in connection with the work piece in Figs. 10 to 13 inclusive, during which time the cutter arbor is being driven in the opposite direction. The movement of the tables carries the work pieces A back against the rotating cutters which first slightly engage portions of the opposite sides c—c of the concave portions of the work piece to be milled, and as the table and the work piece turn the central portions of the latter are brought into closer engagement with the cutters as indicated in Fig. 12 and from which point to that indicated in Fig. 13 the deepest portion of the milling operation is performed, from here the cutter continues to operate but gradually runs out leaving a finish similar to that on the opposite side where it ran in. From there the work piece continues on back to the position shown in Figs. 5 and 11 at which time the slide and its table have returned to their foremost position, whereupon the trip mechanism is operated by the cam 33 and automatically releases the clutch 69 thus stopping further movement of the table and slides though the spindles continue to rotate. This leaves the operator free to remove the finished work pieces and put in others and again operate the hand lever to start the unit off on further milling operations. The operator's attention can then be given to the other unit, which in the meantime has returned to the front or normal position, and remove the finished work pieces and replace them by new ones.

From the foregoing it will be seen that the machine as timed serves to turn the tables on which the work holding fixtures are mounted once with each cycle of the machine or rotation of the shaft 19. It is possible, however, should occasion require, to employ a different ratio of worm gear on the work table so that the table could be revolved two or three times with each rotation of the shaft, which would make it possible to first perform a roughing cut, second a semifinishing cut and third a finishing cut on the work before taking it out of the fixture.

In the operation of my machine it is not necessary that the work for the two units should be the same since by the use of different tools and work holders one type of work can be milled on one unit and another entirely different shaped piece be milled on the second unit.

While I have referred to the machine as comprising two units of two spindles each yet it will be understood that the units may include three or more spindles and three or more work carrying tables if necessary, which would be desirable for some classes of work, and it will also be borne in mind that the number of units can likewise be increased where increased production is required.

Having thus described my invention what I claim and desire to secure by Letters Patent is:

1. In a milling machine of the class described, a base and column, cutter arbors, a motor for driving said arbors, a saddle slidably mounted on the base having an opening therethrough, bearing posts secured to the base and extended through said openings of the saddle, a pair of rotary tables mounted on the saddle in alignment with said cutter arbors and having central openings therethrough to receive the bearing posts and cutter arbors, means for reciprocating the saddle and tables backward and forward and means for rotating the tables during their reciprocatory movement in a way to carry work pieces mounted thereon around the cutter arbors.

2. In a milling machine, a frame including a bed and column, a slide mounted in the column, spindle blocks carried by the slide, means for raising and lowering the slide, cutter spindles mounted in the blocks, cutter arbors, means for rotating the cutter arbors, a saddle slidably mounted on the bed, a bearing post secured to the frame and extending up through the saddle, rotatable work tables carried by the saddle having an opening therethrough larger than that of said post to enable the tables and saddle to be moved horizontally with respect to the arbor and post, a drive shaft for reciprocating the tables, clutch means for engaging and disengaging the saddle operating means with said shaft, means for normally holding said clutch in engagement to insure rotation of the tables and movement of the saddle, and means for releasing the clutch to stop said movements.

3. In a milling machine, a frame, a pair of vertically disposed arbors each including spaced apart cutters thereon positioned intermediate the length of the arbor, means for rotating the same, means for raising and lowering the same, a reciprocatory saddle, a pair of fixed cutter posts forming bearings for the free ends of the arbors, a pair of rotatable work tables mounted on the saddle and encircling the posts, a common drive means for simultaneously rotating the two tables, means for moving the tables into and out of axial alignment with said cutter arbors to feed work pieces carried thereby against and around the cutter arbors above the posts for the milling of concave surfaces.

4. In a milling machine, the combination of a frame, bearing posts secured to the frame, a pair of vertically disposed rotatable cutter arbors in vertical alignment with the posts, means for raising and lowering the arbors with respect to the posts, a pair of rotatable work tables mounted to operate concentric and eccentric with respect to the cutter arbors, a common saddle for the two said work tables, a common drive means for simultaneous operations of the two tables, means for moving the tables from concentric to eccentric positions and vice versa with respect to the cutter and arbors to move a work piece mounted on the tables around the arbor for the milling of concave surfaces.

5. A milling machine of the class described, comprising a base, a pair of rotary work tables having central openings therethrough, a bearing post secured to the frame and extended up in the openings of the table, a rotatable cutter arbor positioned central above and independent of each table, means for rotating the cutter arbors, means for raising and lowering the cutter arbor with respect to the tables, means for rotating the tables, means for reciprocating the tables backward and forward during their rotations and with respect to the post and cutter arbor in a manner to carry the work piece around the cutter arbor during the milling operation.

6. A milling machine of the class described, comprising a base, a saddle slidably mounted on the base and having openings therethrough, bearing posts secured to the base and extending through the openings of the saddle, a pair of rotary work tables mounted on the saddle and each having an opening therethrough to freely receive the post, a rotatable cutter arbor mounted above and in axial alignment with each bearing post, means for rotating the cutter arbors, means for raising and lowering the cutter arbors with respect to the posts and tables, means for reciprocating the saddle and tables backward and forward with respect to the cutter arbors in a manner to carry work pieces mounted thereon around the cutter arbors.

7. A milling machine of the class described, comprising a base, a bearing post secured to the base, a saddle slidably mounted on the base and having an opening therethrough to accommodate the bearing post, a rotary work table mounted on the saddle and having a central vertical opening therethrough of a larger diameter than that of the post to accommodate the same, a cutter arbor in alignment with and adapted to be positioned in the post, means for rotating the cutter arbor, means for raising and lowering the cutter arbor to engage and disengage the bearing post, means for reciprocating the saddle and table backward and forward with respect to the cutter arbor with each rotation of the table in a manner to carry the work piece mounted thereon around the cutter arbor.

8. A milling machine designed to mill out inner concaved surfaces, comprising a bed, a pair of milling units mounted on the bed, each unit comprising a saddle slidably mounted on the bed, two rotary work tables mounted on each saddle, vertically disposed rotatable cutter arbors mounted above each table each including spaced apart cutters positioned intermediate the length of the arbors, means for supporting the lower end of the cutter arbor independent of the tables, means for rotating the cutter arbor, means for raising and lowering the cutter arbor, means for simultaneously reciprocating the saddle and tables backward and forward in a manner to carry a work piece mounted thereon around each cutter arbor and the means for supporting the same with respect to the cutter arbor, a common drive shaft for the two units, means for engaging and disengaging the respective units with said drive shaft to cause alternate operations of said units.

9. A milling machine of the class described comprising a frame including a bed and column, slides mounted in the column, a cutter arbor mounted in each of said slides, a motor for driving said cutter arbors, a saddle slidably mounted on the bed, a bearing post secured to the frame, a pair of rotary work tables mounted on the saddle and each having a central opening therethrough to receive the cutter arbor and post, means for reciprocating the saddle and tables backward and forward with respect to the cutter arbors and post and means for rotating the tables in a way to move the work pieces upon the tables to and from and around the cutter arbors.

10. A milling machine of the class described, comprising a bed, a saddle slidably mounted on the bed, a pair of rotary work tables mounted on the saddle having elongated openings therethrough, a drive shaft within the saddle, a worm and gear connection from said shaft for each of said tables to insure simultaneous operations of the two tables, a rotatable cutter arbor mounted central and independent of each table, a bearing post secured to the bed and extended into the opening of the table, means for rotating the cutter arbor, means for raising and lowering the cutter arbor with respect to the tables and posts, and means for reciprocating the saddle and the tables backward and forward with respect to the cutter arbors in a manner to carry the work pieces mounted on the tables around the cutter arbor.

11. A milling machine of the class described, comprising a bed, a slide mounted in the bed, a saddle adjustably secured to the slide, bearing posts secured to the bed, a pair of rotary work tables mounted on the saddle and having openings therein to accommodate the posts, means for simultaneously rotating the two said tables, a rotatable cutter arbor positioned in alignment above and independent of each post and table, a cam and shaft for reciprocating the table slide and tables with respect to the cutter arbor to carry the work piece mounted on the table around said cutter arbor, worm and gear drive connection for said shaft, means for rotating the cutter arbor and means for raising and lowering the said arbors with respect to the tables.

12. In a milling machine, a frame including a bed and column, a slide mounted in the bed, a saddle secured to the slide and slidably mounted on the bed, a cam and spring means for reciprocating the slide and saddle, a pair of rotary work tables mounted on the saddle, a worm and gear for rotating each work table, means for adjusting the saddle upon the slide, a pair of cutter arbors, means secured to the bed for supporting the operative end portion of each arbor in axial alignment with the normal position of each table when in operative engagement with work carried by a table, a fixture plate adjustably mounted on the table and adapted to support a work piece in a manner to carry it around the arbor with each rotation of the table.

13. A milling machine of the class described, comprising a base, a saddle slidably mounted on the base and having openings therethrough, rotary work holders mounted on the saddle having openings therethrough to register with those of the saddle, cutter spindles, cutter arbors carried thereby, cutters mounted on the arbors, a bearing post beneath and in alignment with each arbor, means for rotating the arbors and cutters, means for raising and lowering said arbors and cutters with respect to the bearing posts, means for reciprocating the saddle and tables backward and forward with respect to the cutter arbors in a manner to mill the interior of concave faced work pieces mounted thereon and carry the same around the cutter arbor during each forward and backward movement of the saddle.

NEWMAN M. MARSILIUS.